United States Patent [19]
Krivohlavek et al.

[11] Patent Number: 5,750,598
[45] Date of Patent: May 12, 1998

[54] BITUMEN/POLYMER COMPOSITION VULCANIZABLE AT TEMPERATURES BELOW 100°C

[75] Inventors: Dennis Krivohlavek, Claremore, Okla.; Gayle King, Terre Haute, Ind.; Jean-Pascal Planche, Lyons, France

[73] Assignee: Elf France, Courbevoie, France

[21] Appl. No.: 400,180

[22] Filed: Mar. 6, 1995

Related U.S. Application Data

[63] Continuation of Ser. No. 93,987, Jul. 19, 1993, abandoned, which is a continuation of Ser. No. 872,496, Apr. 23, 1992, abandoned.

[51] Int. Cl.$^6$ .................................................. C08L 95/00
[52] U.S. Cl. ................. 524/71; 524/60; 524/61; 524/70
[58] Field of Search .................. 524/71, 60, 68, 524/70, 62

[56] References Cited

U.S. PATENT DOCUMENTS

| | | | |
|---|---|---|---|
| 4,554,313 | 11/1985 | Hagenbach | 524/68 |
| 5,100,938 | 3/1992 | Vitkuske | 524/68 |
| 5,120,777 | 6/1992 | Chaverot | 524/62 |

*Primary Examiner*—Christopher Henderson
*Attorney, Agent, or Firm*—Burgess, Ryan & Wayne

[57] ABSTRACT

The bitumen/polymer composition comprises a bitumen, an elastomeric polymer vulcanisable with sulphur in an amount of 0.5 to 20% by weight of the bitumen, a sulphur-donating vulcanising agent, a vulcanisation accelerator and a viscosity-reducing agent chosen from water and hydrocarbon oils. The vulcanisation accelerator present in the composition consists of one or more vulcanisation accelerators active at temperatures below 100° C., and the viscosity-reducing agent is used in an amount suitable for rendering the composition liquid at temperatures below 100° C.

33 Claims, No Drawings

BITUMEN/POLYMER COMPOSITION VULCANIZABLE AT TEMPERATURES BELOW 100°C

This application is a continuation of application Ser. No. 093,987, filed Jul. 19, 1993, now abandoned, which is an FWC of U.S. Ser. No. 872,496, filed Apr. 23, 1992, abandoned.

BACKGROUND OF THE INVENTION

1) Field of the Invention

The invention relates to a bitumen/polymer composition vulcanisable at temperatures below 100° C. It also relates to the preparation of such a composition and likewise relates to the use of the composition for applications in road engineering, sealing applications in civil engineering or in buildings or even for industrial applications.

2) Description of the Related Art

It is known that the addition of various polymers to conventional bitumens makes it possible to change the mechanical properties of the latter in a favourable manner and to form bitumen/polymer compositions which have improved mechanical properties with respect to those of bitumens by themselves.

The polymers suitable for being added to bitumens are most frequently elastomers such as polyisoprene, butyl rubber, polybutene, polyisobutene, ethylene/vinyl acetate copolymers, polymethacrylate, polychloroprene, ethylene/propylene/diene terpolymer (EPDM), polynorbornene, or even random or block copolymers of styrene and a conjugated diene.

Of the polymers added to the bitumens, the random or block copolymers of styrene and of a conjugated diene and especially of styrene and butadiene or of styrene and isoprene are particularly efficient, because they dissolve very easily in the bitumens and give them excellent mechanical and dynamic properties and especially very good viscoelastic properties.

It is also known that the stability of bitumen/polymer compositions can be improved by coupling the polymer to the bitumen, this improvement making it furthermore possible to extend the application range of bitumen/polymer compositions.

Bitumen/polymer compositions for which a random or block copolymer of styrene and of a conjugated diene such as butadiene or isoprene is coupled with bitumen can be prepared by using the processes described in U.S. Pat. Nos. 4,145,322, 4,242,246, 4,554,313 and FR-A-2636340. In these processes, said copolymer and a sulphur source are incorporated into bitumen, the reaction being carried out at between 100° C. and 230° C. and with stirring, stirring of the mixture thus formed is then continued at a temperature between 100° C. and 230° C. over a period of more than 10 minutes and especially for 10 to 90 minutes. The sulphur source consists of sulphur not bound chemically (U.S. Pat. Nos. 4,145,322 and 4,242,246), of an organic polysulphide (U.S. Pat. No. 4,554,313) or a sulphur-donating vulcanisation accelerator used by itself or together with sulphur not bound chemically, with a polysulphide or even a sulphur-nondonating vulcanisation accelerator (FR-A-2636 340), and the copolymer and the sulphur source are incorporated into the bitumen either by direct addition of said ingredients to the bitumen (U.S. Pat. Nos. 4,145,322, 4,554,413 and FR-A-2636340) or by preparing first a stock solution of the copolymer and the sulphur source in a hydrocarbon oil and then adding said stock solution to the bitumen (U.S. Pat. Nos. 4,242,246, 4,554,313 and FR-A-2636340).

A disadvantage encountered during modification of the bitumens by polymers is the increase in viscosity of the bitumen/polymer compositions obtained, this increase being very marked when the technique for preparing the bitumen/polymer composition leads to extensive vulcanisation of the polymer inside the bitumen, which is the case especially for the preparation techniques described in the publications cited above. This severely limits the final molecular weight of the polymer present in a bitumen/polymer composition of the vulcanised type, if it is desired that the viscosity of such a composition be compatible with the conventional techniques for making use of this composition.

The object of the invention is to provide a bitumen/polymer composition which is vulcanisable at temperatures below 100° C. and especially at temperatures ranging from ambient road temperatures to 100° C., which makes it possible to prepare and use this composition in a weakly vulcanised state, thus facilitating said use and allowing vulcanisation to proceed after production and/or after application of the composition.

SUMMARY OF THE INVENTION

The bitumen/polymer composition according to the invention is of the type comprising a bitumen, an elastomeric polymer vulcanisable with sulphur in an amount of 0.5 to 20% by weight of the bitumen, a sulphur-donating vulcanising agent in an amount suitable for providing 0.2 to 20% by weight of sulphur, relative to the elastomeric polymer, a vulcanisation accelerator and a viscosity-reducing agent chosen from water and hydrocarbon oils having a distillation range at atmospheric pressure, determined in accordance with ASTM Standard D 86-87, between 100° C. and 500° C. and more specifically between 150° C. and 400° C., and it is characterised in that the vulcanisation accelerator it contains consists of one or more vulcanisation accelerators active at temperatures below 100° C., especially at temperatures between ambient temperature and 100° C., and in that the viscosity-reducing agent is present in an amount suitable for rendering the composition fluid at temperatures below 100° C., especially at temperatures between ambient temperature and 100° C.

Figure 1:
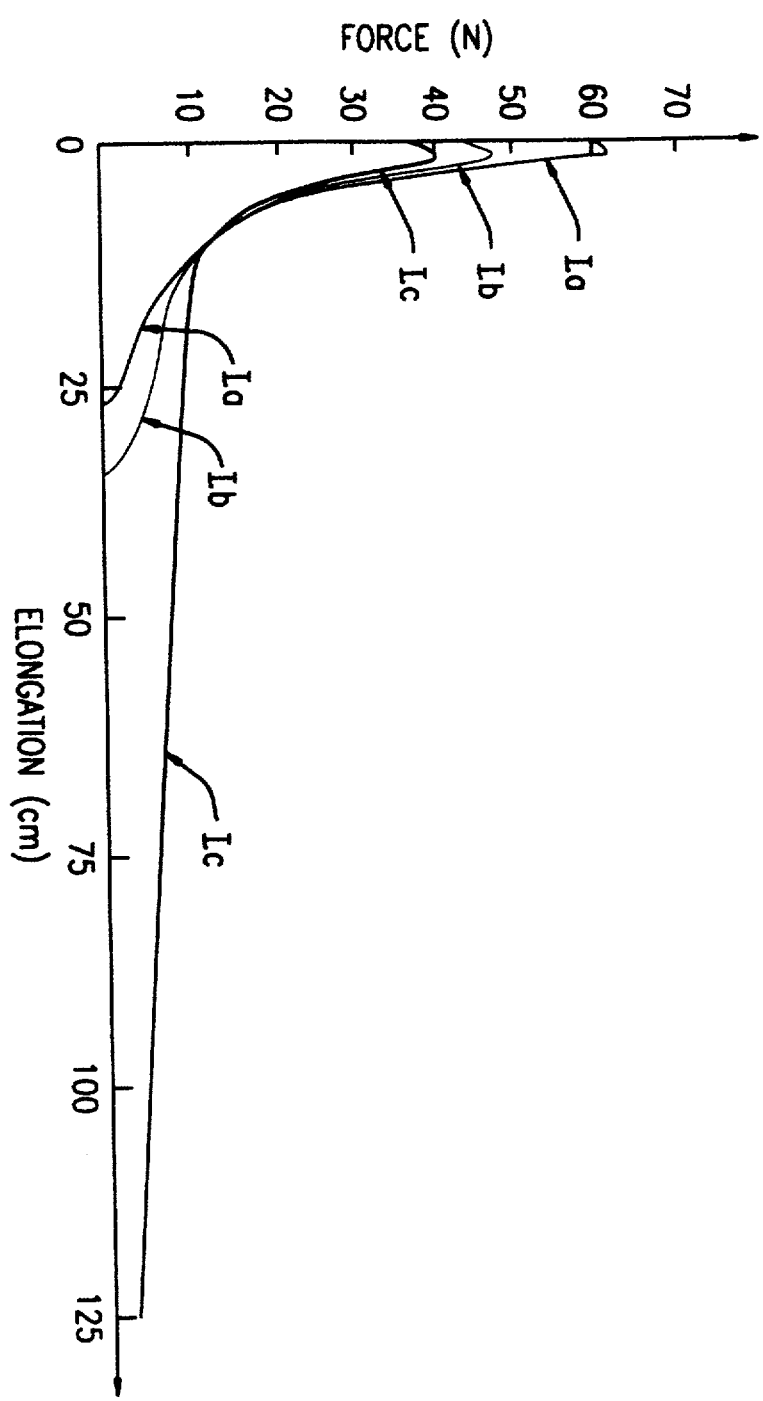
FIGS. 1, 2 and 3 are graphs depicting the force/elongation curves obtained in the "force/ductility" tests of asphalt binders derived from emulsions as set forth in Examples 1, 2 and 3 respectively.

The bitumen, which represents one of the components of the bitumen/polymer composition, is preferably chosen from the various bitumens having a penetration, determined in 1/10 mm in accordance with the NF Standard T 66004, which ranges from 10 to 500 and preferably from 10 to 300. Such bitumens can be in particular bitumens from direct distillation or distillation under reduced pressure, or also blown or semi-blown bitumens or mixtures of such bitumens, said bitumens or mixtures of bitumens having a penetration within the ranges given above.

The elastomeric polymer vulcanisable with sulphur and present in the bitumen/polymer composition can be a polymer such as polyisoprene, polynorbornene, polybutadiene, butyl rubber, or ethylene/propylene/diene terpolymer (EPDM). Advantageously, said elastomeric polymer is chosen from random or block copolymers of styrene and of a conjugated diene, since these copolymers dissolve very easily in bitumens and give the latter excellent mechanical and dynamic properties and especially very good viscoelastic properties. The copolymer of styrene and of a conjugated diene is in particular chosen from block copolymers of styrene and butadiene, styrene and isoprene, styrene and chloroprene, styrene and carboxylated butadiene and styrene and carboxylated isoprene. The copolymer of styrene and conjugated diene, and in particular each of the abovementioned copolymers, advantageously has a styrene content by weight ranging from 2% to 50% and preferably from 5% to 40%. The viscosity-average molecular weight of the copolymer of styrene and conjugated diene, and especially that of the copolymers mentioned above, can be, for example, between 10,000 and 600,000 and is preferably between 30,000 and 500,000.

The copolymer of styrene and conjugated diene is preferably chosen from linear or star-shaped three-block copolymers or two-block copolymers of styrene and butadiene, styrene and isoprene, styrene and carboxylated butadiene or also styrene and carboxylated isoprene, which have styrene contents and molecular weights in the ranged defined above.

The sulphur-donating vulcanising agent used in the bitumen/polymer composition can consist of one or more products chosen from elemental sulphur, polysulphides and other sulphur-donating molecules. The elemental sulphur which can be used in part or entirely as the sulphur-donating vulcanising agent is advantageously sublimed sulphur and preferably sulphur crystallised in the orthorhombic form and known under the name of alpha-sulphur. Of the polysulphides, in particular the hydrocarbon polysulphides, thiuram polysulphides, alkylphenol disulphides and disulphides such as morpholine disulphide and caprolactam N,N'-disulphide can be cited.

The hydrocarbon polysulphides have the general formula $R_1-(S)_m-(R_3-(S)_m)_rR_2$, in which $R_2$ and $R_2$ each represent a monovalent saturated or unsaturated $C_1$- to $C_{20}$-hydrocarbon radical or are linked to one another with the formation of a divalent saturated or unsaturated $C_1$- to $C_{20}$-hydrocarbon radical which forms a ring with the other atom groups associated with the formula, $R_3$ is a divalent saturated or unsaturated $C_1$- to $C_{20}$-hydrocarbon radical, the $-(S)_m-$ are divalent groups each formed by m sulphur atoms, in which m can be different within said groups and represents integers ranging from 1 to 6 with at least one of the m being equal to or greater than 2, and r represents an integer adopting the values from zero to 10.

In the abovementioned formula, the monovalent $C_1$- to $C_{20}$-hydrocarbon radicals $R_1$ and $R_2$ and the divalent $C_1$- to $C_{20}$-hydrocarbon radical $R_3$ are chosen especially from aliphatic, alicyclic or aromatic radicals. When the radicals $R_1$ and $R_2$ are linked to one another with the formation of a divalent $C_1$- to $C_{20}$-hydrocarbon radical which forms a ring with the other atom groups associated with the formula, said divalent radical is similar to the radical $R_3$ and can likewise be of the aliphatic, alicyclic or aromatic type. In particular radicals $R_1$ and $R_2$ are identical and chosen from $C_1$- to $C_{20}$-alkyl radicals, for example ethyl, propyl, hexyl, octyl, nonyl, decyl, linear dodecyl, tert.-dodecyl, hexadecyl, octadecyl and cycloalkyl and aryl $C_6$- to $C_{20}$-radicals, especially benzyl, phenyl, tolyl, cyclohexyl, whereas the radical $R_3$ or the divalent radical formed by the combination of $R_1$ and $R_2$ is chosen from $C_1$- to $C_{20}$-alkylene radicals or $C_6$- to $C_{20}$-cycloalkylene or arylene radicals, especially phenylene, tolylene or cyclohexylene.

Polysulphides usable according to the invention are in particular those defined by the formula $$R_1-(S)_n-R_2,$$

in which $R_1$ and $R_2$ each denote a monovalent saturated or unsaturated $C_1$- to $C_{20}$-hydrocarbon radical or are linked to one another with the formation of a divalent $C_1$- to $C_{20}$- radical $R_3$, $R_1$, $R_2$ and $R_3$ being as defined above, $-(S)_n-$ represents a divalent group formed by a chain of n sulphur atoms, n being an integer ranging from 2 to 6.

Preferred polysulphides have the general formula $R_{4-(S)}$ $_p-R_4$, in which $R_4$ denotes a $C_6$- to $C_6$-alkyl radical and $-(S)_p-$ represents a divalent group formed by a chain of p sulphur atoms, p being an integer ranging from 2 to 5. Examples of such polysulphides are especially dihexyl disulphide, dioctyl disulphide, didodecyl disulphide, ditert.-dodecyl disulphide, dihexadecyl disulphide, dihexyl trisulphide, dioctyl trisulphide, dinonyl trisulphide, ditert.-dodecyl trisulphide, dihexadecyl trisulphide, dihexyl tetrasulphide, dioctyl tetrasulphide, dinonyl tetrasulphide, ditert.-dodecyl tetrasulphide, dihexadecyl tetrasulphide, dihexyl pentasulphide, dioctyl pentasulphide, dinonyl pentasulphide, ditert.-dodecyl pentasulphide, and dihexadecyl pentasulphide.

Other polysulphides which can be used according to the invention are, for example, polysulphides such as diphenyl trisulphide, dibenzyl trisulphide, diphenyl tetrasulphide, ortho-tolyl tetrasulphide, dibenzyl tetrasulphide, dibenzyl pentasulphide, diallyl pentasulphide and tetramethyltetrathiane.

The thiuram polysulphides have in particular the formula

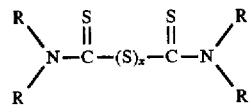

in which the R, identical or different, each represent a $C_1$- to $C_{12}$- and preferably $C_1$- to $C_8$-hydrocarbon radical, especially an alkyl, cycloalkyl or aryl radical, or two radicals R connected to the same nitrogen atom are linked to one another with the formation of a divalent $C_2$- to $C_8$-hydrocarbon radical and x is a number ranging from 2 to 8. Examples of such thiuram polysulphides are especially the compounds dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

Preferably, the vulcanising agent is present in the bitumen/polymer composition in an amount suitable for providing 0.5 to 10% by weight of sulphur, relative to the elastomeric polymer.

The vulcanisation accelerators active at temperatures below 100° C. and especially at temperatures between ambient temperature and 100° C., which are used as the vulcanisation accelerator present in the bitumen/polymer composition, are especially dithiocarbamates such as piperidinium pentamethylenedithiocarbamate, dimethylcyclohexylammonium dibutyldithiocarbamate and the activated dithiocarbamate marketed by VANDERBILT under the name BUTYL EIGHT®.

The proportion of vulcanisation accelerator active at temperatures below 100° C. in the bitumen/polymer composition is advantageously between 0.05% and 15% by weight of the elastomeric polymer and is more particularly 0.1% to 10% of this weight.

The bitumen/polymer composition can also comprise various additives and especially nitrogen-containing compounds, such as amines and amides which play the role of promoters for the adhesion of said composition to the inorganic surfaces.

According to an embodiment of the bitumen/polymer composition according to the invention, the viscosity-reducing agent is water. The bitumen/polymer composition is then present in the form of an aqueous emulsion formed from a dispersion of an organic phase consisting of a homogeneous mixture of bitumen, the elastomeric polymer vulcanisable with sulphur, the sulphur-donating vulcanising agent and the vulcanisation accelerator in an aqueous phase comprising an emulsifying system and, if desired, an agent for controlling the pH of the emulsion.

In said emulsion, the amount of organic phase which consists of the homogeneous mixture mentioned above advantageously represents 30 to 90% and preferably 50 to 85% of the weight of the emulsion.

The emulsifying system present in the aqueous phase of the emulsion can be of cationic, anionic, nonionic or even amphoteric nature. An emulsifying system of cationic nature, which gives rise to a cationic emulsion, comprises one or more cationic emulsifying agents which can advantageously be chosen from cationic nitrogen-containing emulsifying agents such as fatty monoamines, polyamines, amidoamines, amidopolyamines, salts or oxides of said amines and amidoamines, reaction products of the above-mentioned compounds with ethylene oxide and/or propylene oxide, imidazolines and quaternary ammonium salts. The emulsifying system of cationic nature can be formed in particular by the association of one or more cationic emulsifying agents A chosen from cationic nitrogen-containing emulsifying agents of the type of monoamines, diamines, amidoamines, oxides of such amines or amidoamines, reaction products of such compounds with ethylene oxide and/or propylene oxide and quaternary ammonium salts, with one or more emulsifying agents B chosen from cationic nitrogen-containing emulsifying agents having in their molecule at least three functional groups chosen from amine and amide groups such that at least one of said functional groups is an amine group, in which the ratio of the relative amount of compound(s) A to the relative total amount of compounds A and B ranges in particular from 5% to 95%. An emulsifying system of anionic nature, which gives rise to an anionic emulsion, comprises one or more anionic emulsifying agents which can be chosen especially from alkali metal salts or ammonium salts of fatty acids, alkali metal polyalkoxycarboxylates, alkali metal N-acylsarcosinates, alkali metal hydrocarbon sulphonates and especially sodium alkylsulphonates, sodium arylsulphonates and sodium alkylarylsulphonates, sodium alkylarenesulphonates, sodium lignosulphonates, sodium dialkyl sulphosuccinates and sodium alkylsulphates. It is likewise possible to use an emulsifying system of nonionic nature formed by one or more nonionic emulsifying agents which can be chosen especially from ethoxylated fatty alcohols, ethoxylated fatty acids, sorbitan esters, ethoxylated sorbitan esters, ethoxylated alkylphenols, ethoxylated fatty amides and glycerol esters of fatty acids. It is also possible to use an emulsifying system of amphoteric nature formed by one or more amphoteric emulsifying agents which can be chosen, for example, from betaines and amphoteric imidazolinium derivatives. It is likewise possible to use an emulsifying system consisting of a mixture of emulsifying agents of different nature, for example a mixture of one or more anionic or cationic emulsifying agents with one or more nonionic and/or amphoteric emulsifying agents. For more details on the emulsifying agents suitable as emulsifying systems usable according to the invention the KIRK-OTHMER handbook entitled ENCYCLOPEDIA OF CHEMICAL TECHNOLOGY, Third Edition, Volume 22, pages 347 to 360 (anionic emulsifiers), pages 360 to 377 (nonionic emulsifiers), pages 377 to 384 (cationic emulsifiers) and pages 384 to 387 (amphoteric emulsifiers) can be consulted.

The amount of emulsifying system present in the emulsion can vary fairly widely. This amount can advantageously be 0.03% to 3% and preferably 0.06 to 2% of the total weight of the emulsion.

The agent used, if desired, for adjusting the pH of the emulsion to the desired value can be an acid, for example a mineral acid such as HCl, $HNO_3$, $H_3PO_4$ or a saturated or unsaturated mono- or polycarboxylic acid, such as acetic acid, formic acid, oxalic acid or citric acid, when the pH of the emulsion must be lowered, or a base or a basic salt, especially an inorganic base consisting of an alkali metal hydroxide such as sodium hydroxide or of an alkaline earth metal oxide or hydroxide, when the pH of the emulsion must be increased.

The bitumen/polymer composition in the form of an aqueous emulsion is obtained by first of all preparing a homogeneous mixture comprising the bitumen, the elastomeric polymer vulcanisable with sulphur, the vulcanising agent and the vulcanisation accelerator, then converting said mixture into an aqueous emulsion, the aqueous emulsion produced having a temperature below 100° C. and especially a temperature between ambient temperature and 100° C. and subsequently being maintained at such a temperature during its storage and use.

In order to produce said homogeneous mixture to be converted subsequently into an aqueous emulsion, the preferred procedure is such that first of all the elastomeric polymer is brought into contact with the bitumen in the molten state, i.e. maintained at temperatures between 100° C. and 230° C. and preferably between 120° C. and 180° C., stirring the mixture over a period, generally of the order of a few tens of minutes to several hours and, for example, 20 minutes to 5 hours, sufficient for forming a homogeneous product, then incorporating the vulcanising agent and subsequently the vulcanisation accelerator into said homogeneous product while the mixture is all the time stirred and maintained in the molten state.

The amounts of elastomeric polymer, vulcanising agent and vulcanisation accelerator incorporated in succession into the bitumen, so as to obtain the homogeneous mixture, are chosen such that they are within the ranges defined above for these amounts.

Before incorporating the vulcanising agent and the vulcanisation accelerator into the homogeneous product resulting from incorporation of the elastomeric polymer into the bitumen, said homogeneous product can additionally be subjected to prevulcanisation by means of a sulphur-donating vulcanising system, which may consist of sulphur not bound chemically, an organic polysulphide or also a sulphur-donating vulcanisation accelerator used by itself or together with one or more members of the group formed by sulphur not bound chemically, organic polysulphides and sulphur-nondonating vulcanisation accelerators, said prevulcanisation being carried out in such a manner that a homogeneous prevulcanised product having a viscosity of at most 2 Pa.s in the molten state is obtained. In order to carry out this prevulcanisation, the procedure can be such that the sulphur-donating vulcanising system is incorporated into the homogeneous product in the molten state in an amount suitable for providing an amount of elemental or atomic sulphur representing 0.5 to 10% and more particularly 1% to 8% by weight of the elastomeric polymer used for producing the abovementioned homogeneous bitumen/polymer product and the entire mixture is maintained at a temperature between 100° C. and 230° C. and preferably between 120° C. and 180° C. with stirring for a period sufficient for forming a homogeneous prevulcanised product having the desired viscosity in the molten state. It is furthermore possible to prepare the homogeneous prevulcanised product by incorporating the elastomeric polymer and the sulphur-donating vulcanising system into the bitumen in the form of a stock solution of these products in a hydrocarbon oil, which can be chosen especially from those defined above as suitable viscosity-reducing agents.

As soon as the abovementioned homogeneous mixture comprising the homogeneous non-prevulcanised or prevulcanised product is obtained, it is converted into an aqueous emulsion. To this end, an intimate dispersion of said homogeneous mixture in an aqueous phase comprising the emulsifying system is prepared in an emulsion-forming zone and especially in an apparatus of the colloidal mill type in an amount suitable for obtaining the concentration defined above with the optional addition of an agent for controlling the pH. On the one hand, the homogeneous mixture in the form of a molten mass whose temperature is between 100° C. and 180° and preferably between 120° C. and 160° C. and, on the other hand, the aqueous phase comprising the abovementioned components and having a temperature between 15° C. and 80° C. and preferably between 20° C. and 60° C. are introduced simultaneously and separately into the emulsion-forming zone, and the entire mixture is kept in said zone for a period sufficient for forming the emulsion. It is also possible to premix said homogeneous mixture and said aqueous phase before introducing them into the emulsion-forming zone.

If necessary, a viscosity-controlling additive consisting, for example, of a water-soluble polyurethane or a gum such as xanthan or scleroglucan can be present in the aqueous phase used in the preparation of the aqueous emulsion.

During preparation of the emulsion, the aqueous phase comprising the emulsifying system and the optional ingredients, such as pH-controlling agent and viscosity-regulating additive on the one hand and the homogeneous mixture on the other hand are introduced into the emulsion-forming zone in such proportions that the resulting emulsion advantageously comprises by weight, as indicated above, 30 to 90% and preferably 50 to 85% of organic phase composed of the homogeneous mixture comprising the bitumen, the elastomeric polymer vulcanisable with sulphur, the sulphur-donating vulcanising agent and the vulcanisation accelerator.

As indicated above, once the aqueous emulsion is obtained, it is used directly or stored with a view to later use, in both cases being maintained at temperatures below 100° C. and especially between ambient temperature and 100° C.

According to another embodiment of the bitumen/polymer composition according to the invention, the viscosity-reducing agent is a hydrocarbon oil having a distillation range at atmospheric pressure, determined in accordance with ASTM Standard D 86-87, between 100° C. and 500° C. and more specifically between 150° C. and 400° C. The bitumen/polymer composition is thus in the form of a homogeneous hydrocarbon composition which comprises the bitumen, the elastomeric polymer vulcanisable with sulphur, the vulcanising agent, the vulcanisation accelerator and the hydrocarbon oil, the hydrocarbon oil content being such that said composition is fluid at temperatures below 100° C. and especially between ambient temperature and 100° C. Said hydrocarbon oil content is advantageously 2% to 70% and preferably 3 to 40% of the weight of the bitumen.

The hydrocarbon oil usable according to the invention can be, for example, a petroleum distillate, such as a petroleum cut of aromatic character, a petroleum cut of naphthenoaromatic character, a petroleum cut of naphthenoparaffinic character or a petroleum cut of paraffinic character, or coal tar oil or oil of vegetable origin.

In order to produce the homogeneous hydrocarbon composition defined above, the preferred procedure is such that first of all the elastomeric polymer is brought into contact with the bitumen in the melted state, i.e. maintained at temperatures between 100° C. and 230° C. and preferably between 120° C. and 180° C., the mixture is stirred for a period, in general of the order of a few tens of minutes to several hours and, for example, 20 minutes to 5 hours, sufficient for forming a homogeneous product, and then the vulcanising agent and subsequently the vulcanisation accelerator and likewise the hydrocarbon oil are then incorporated into said homogeneous product, while the mixture is all the time stirred and maintained in the molten state, incorporation of the hydrocarbon oil being carried out before incorporation of the vulcanising agent or after incorporation of the vulcanisation accelerator, the homogeneous hydrocarbon composition produced having a temperature below 100° C. and especially a temperature between ambient temperature and 100° C. and being subsequently maintained at such a temperature especially during storage and use thereof.

The amounts of elastomeric polymer, vulcanising agent, vulcanisation accelerator and hydrocarbon oil incorporated into the bitumen so as to produce the homogeneous hydrocarbon composition are chosen such that they are within the ranges defined above for these amounts.

Once the homogeneous hydrocarbon composition is obtained, it can be used directly or stored with a view to later use and is in either case maintained at temperatures below 100° C. and especially between ambient temperature and 100° C.

When the homogeneous mixture, which is then converted to an aqueous emulsion, or the homogeneous hydrocarbon composition is prepared, the homogeneous product resulting from incorporation of the elastomeric polymer into the bitumen can be obtained by first of all incorporating the elastomeric polymer into a portion only of the bitumen and then mixing the product obtained with the remaining bitumen.

The bitumen/polymer composition according to the invention, which is stored and used at temperatures below 100° C. and especially between ambient temperature and 100° C., is suitable for applications in road engineering, sealing applications in civil engineering or in buildings or even for industrial uses.

The invention is illustrated by the following non-limiting examples.

In these examples, amounts and percentages are by weight unless stated otherwise.

EXAMPLE 1

Three bitumen/polymer compositions in aqueous emulsion were prepared, the first two (Experiment 1.a and Experiment 1.b) being reference compositions and the third (Experiment 1.c) being a composition according to the invention.

Experiment 1.a 94 parts of a bitumen having a penetration of 120-150 were mixed at between 160° C. and 170° C. and with stirring with 6 parts of a two-block copolymer of styrene and butadiene having a viscosity-average molecular weight of about 75,000 and comprising 25% of styrene until a homogeneous product was obtained. This product was then diluted by adding a sufficient amount of the abovementioned bitumen having a temperature between 135° C. and 150° C. so as to obtain a homogeneous mixture comprising 3% of copolymer.

Said homogeneous mixture of bitumen and polymer was then converted into an emulsion by the following procedure.

0.8 part of an emulsifying system consisting of a fatty amine of the polypropylenediamine type was introduced into 80 parts of water maintained at 50° C. with stirring until said emulsifier was completely dispersed. The suspension thus obtained was neutralised with 0.5 part of concentrated hydrochloric acid, while maintaining the entire mixture at a temperature of 50° C. with vigorous stirring. The resulting preparation formed the aqueous phase used for producing the emulsion.

Formation of the emulsion took place in an emulsifier of the colloidal mill type, into which 80 parts of the abovementioned aqueous phase at 50° C. and 200 parts of the homogeneous mixture of bitumen and polymer at about 140° C. were introduced simultaneously and separately. This gave 280 parts of the bitumen/polymer composition in aqueous emulsion, which was brought to and maintained at a temperature of 55° C.

Experiment 1.b

First of all, a homogeneous mixture of bitumen and polymer as described in Experiment 1.a was prepared, 0.2 part of sulphur was then incorporated into the mixture obtained at a temperature of about 140° C. with stirring. Once incorporation of the sulphur was complete, the resulting product was converted into an aqueous emulsion as indicated in Experiment 1.a.

The aqueous emulsion obtained was brought to and maintained at 55° C.

Experiment 1.c

First of all, a homogeneous mixture of bitumen and polymer as described in Experiment 1.a was prepared, 0.2 part of sulphur as the vulcanising agent was then incorporated into the mixture obtained, 0.2 part of BUTYL EIGHT® was then incorporated as the vulcanisation accelerator active at temperatures below 100° C., while maintaining the mixture at a temperature of about 140° C. with stirring. Once incorporation of the sulphur and the vulcanisation accelerator was complete, the resulting product was immediately converted into an aqueous emulsion as indicated in Experiment 1.a. The aqueous emulsion obtained was brought to 55° C. and maintained at that temperature.

Each of the emulsions produced in Experiments 1.a to 1.c was poured into stainless steel dishes at a rate of 1.8 liters/m$^2$ and the contents of the dishes were exposed to a temperature of 60° C. (example of ambient temperature of a road surface) in a convection oven for a certain period. After the desired period of exposure to the temperature of 60° C., the contents of the dishes were then collected by placing these dishes on a hot plate whose temperature was monitored by a surface thermometer and maintained in the range from 50° C.–55° C. and by scraping the contents of the dishes into a metallic canister temperature-controlled at a temperature not exceeding 57° C.

Samples of the asphalt binder collected in the temperature-controlled canister were subjected to the "force/ductility" test such as defined in ASTM Draft Standard P 226.

In this test, a specimen of specific shape obtained from the asphalt binder is stretched at a standardised rate and temperature, and the stretch-resisting force is recorded as a function of the elongation of the specimen.

In the present case, the "force/ductility" test was carried out at 4° C. at a stretching rate of 5 cm/minute, and the force necessary for stretching the specimen, the latter having an efficient initial cross-section of 1 cm$^2$, was recorded as a function of elongation.

The characteristic values of the asphalt binders derived from each of the emulsions 1.a, 1.b and 1.c after exposure to 60° C. in the convection oven for 3 days are illustrated by their force/elongation curves obtained in the "force/ductility" test and shown in FIG. 1 of the accompanying drawing, i.e. curve I.a (emulsion from Experiment 1.a), curve I.b (emulsion from Experiment 1.b) and curve I.c (emulsion from Experiment 1.c).

EXAMPLE 2

A bitumen/polymer composition in aqueous emulsion according to the invention was prepared by following the procedure described in Experiment 1.c of Example 1 except that the two-block copolymer of styrene and butadiene was replaced by the same amount of a radial (star-shaped) copolymer of styrene and butadiene having a viscosity-average molecular weight of about 300,000 and a styrene content of 30%.

Figure 2:
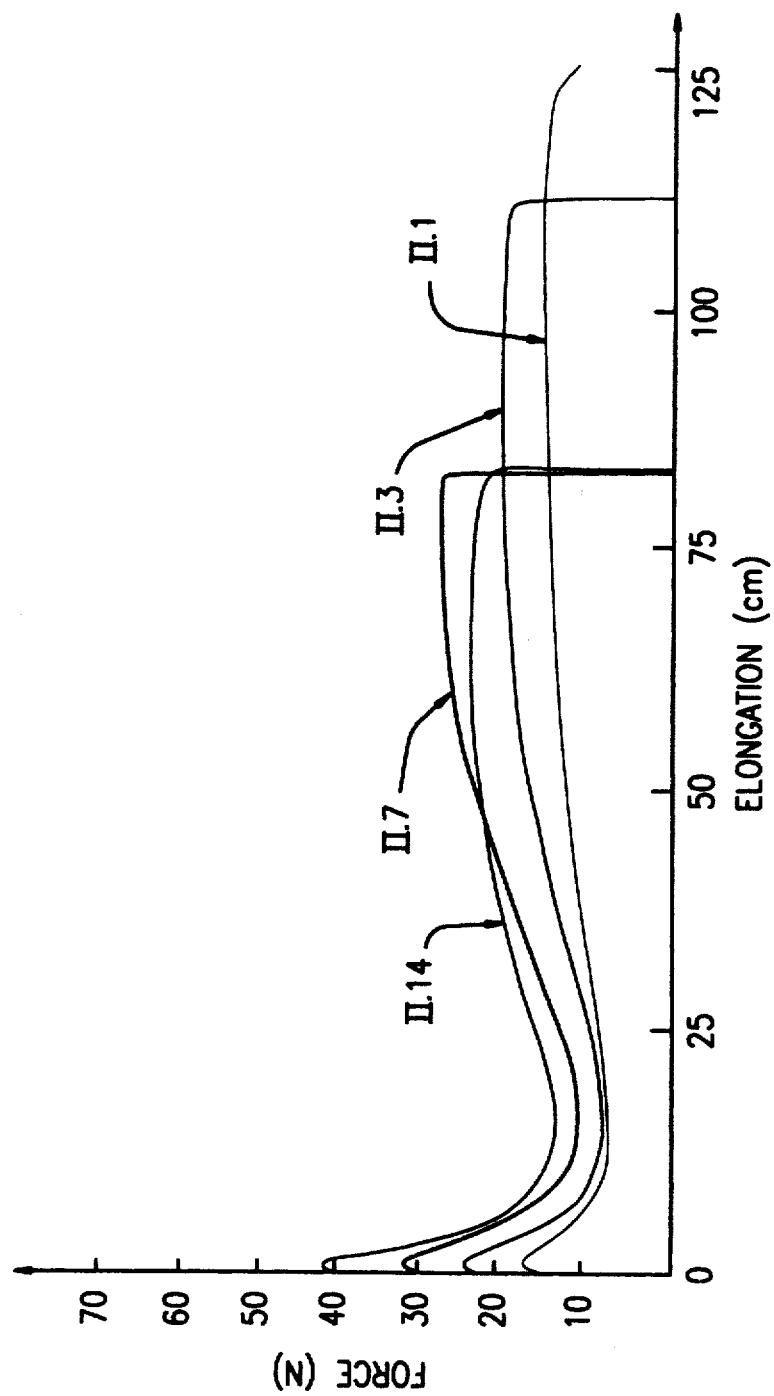

The characteristic values of the asphalt binder derived from the emulsion obtained after exposure to 60° C. in the convection oven for four different periods, i.e. 1, 3, 7 and 14 days and recovery of the contents of the dishes as indicated in Example 1, are illustrated by the force/elongation curves obtained in the "force/ductility" test and shown in FIG. 2 of the accompanying drawing, i.e. curves II.1, II.3, II.7 and II.14 which correspond to exposure times in the convection oven of 1, 3, 7 and 14 days, respectively.

EXAMPLE 3

A bitumen/polymer composition according to the invention of the homogeneous hydrocarbon composition type, i.e. fluidised by a hydrocarbon oil, was prepared.

94 parts of a bitumen having a penetration of 120–150 were mixed at between 160° C. and 170° C. with stirring with 6 parts of a two-block copolymer of styrene and butadiene having a viscosity-average molecular weight of about 75,000 and containing 25% of styrene, until a homogeneous product was obtained. This product was then diluted by adding 100 parts of the abovementioned bitumen, supplied at a temperature between 135° C. and 150° C. so as to obtain a homogeneous mixture containing 3% of copolymer. Said mixture was then fluidised and cooled to 80° C.–90° C. by adding a petroleum distillate, i.e. 13 parts of a petroleum cut having a distillation range of the order of 180° C. to 360° C., said cut being supplied at ambient temperature.

0.2 part of sulphur as vulcanising agent and then 0.2 part of BUTYL EIGHT® as vulcanisation accelerator were incorporated into the fluidised mixture at 80° C.–90° C. with stirring. Once incorporation of sulphur and vulcanisation accelerator was complete, the homogeneous hydrocarbon composition obtained was run into closed vessels and said vessels were then placed into a convection oven, in which they were subjected to temperatures of 80° C.–90° C. for four different periods, i.e. 1, 3, 7 and 14 days.

After being taken out of the convection oven, the asphalt binders present in the vessels were subjected to the ageing test called the "tilt rolling thin film oven test" defined in ASTM Standard D 2872 so as to determine their state of vulcanisation.

The ageing test was carried out with the following modifications:

the temperature in the test oven was adjusted to 88° C.–93° C., and the sample was subjected to the test conditions for 1 hour.

This modified procedure proved sufficient for removing the fluidising agent (petroleum cut) and providing a residual sample allowing the vulcanisation to proceed.

Figure 3:
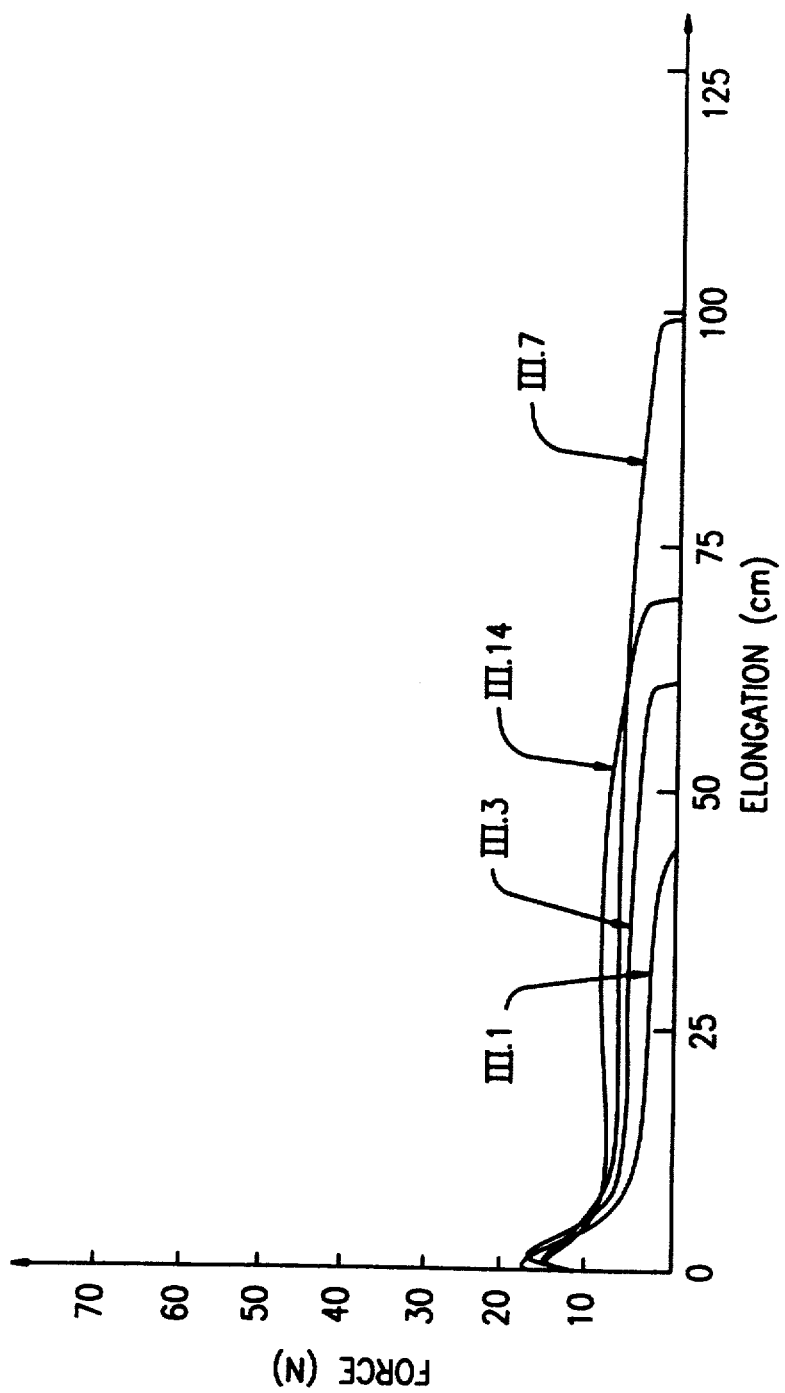

The characteristic values of the asphalt binder derived from the fluidised bitumen/polymer composition, after storage at 80° C.–90° C. for the four abovementioned periods and exposure to the ageing test, are illustrated by the force/elongation curves obtained in the "force/ductility" test and shown in FIG. 3 of the accompanying drawing, i.e. curve III.1, III.3, III.7 and III.14, which correspond to periods of storage in the convection oven of 1, 3, 7 and 14 days respectively.

We claim:

1. A fluidified and reactive bitumen/polymer composition fluid and vulcanizable at a temperature below 100° C. comprising:

a bitumen;

a sulfur-vulcanizable elastomeric polymer being present in an amount of 0.5 to 20% by weight of the bitumen, remaining in a substantially non-vulcanized state after formation of said composition, and being selected from the group consisting of polyisoprene, polynorbornene, polybutadiene, butyl rubber, and ethylene/propylene/diene terpolymer and a copolymer of styrene and a conjugated diene;

a sulfur-donating vulcanization agent in an amount to provide 0.2 to 20% by weight of sulfur, relative to the elastomeric polymer;

a vulcanization accelerator comprising at least one vulcanization accelerator active at a temperature below 100° C. and present in an amount between 0.05% and 15% by weight of the elastomeric polymer; and a viscosity-reducing agent selected from the group consisting of water hydrocarbon oils with a distillation range at atmospheric pressure, determined in accordance with ASTM Standard D86-87, between 100° C. and 500° C., said viscosity-reducing agent present in an amount suitable to render the composition fluid at a temperature below 100° C.

2. Composition according to claim 1, wherein the vulcanisation accelerator is active between ambient temperature and 100° C.

3. Composition according to claim 1, characterised in that the bitumen it contains has a penetration, determined in 1/10 mm in accordance with the NF Standard T 66 004, which ranges from 10 to 500.

4. Composition according to claim 1, wherein the elastomeric polymer vulcanisable with sulphur which it contains is a copolymer of styrene and a conjugated diene chosen from the group consisting of butadiene, isoprene, chloroprene, carboxylated butadiene and carboxylated isoprene.

5. Composition according to claim 4, wherein the copolymer of styrene and of a conjugated diene contains 2 to 50% by weight of styrene.

6. Composition according to claim 4, wherein the copolymer of styrene and of a conjugated diene has a viscosity-average molecular weight between 10,000 and 600,000.

7. Composition according to claim 1, wherein the sulphur-donating vulcanising agent consists of at least one product chosen from the groups consisting of elemental sulphur, polysulphides and other sulphur-donating molecules.

8. Composition according to claim 1, wherein the vulcanising agent it contains is present in an amount suitable for providing 0.5 to 10% by weight of sulphur, relative to the elastomeric polymer.

9. Composition according to claim 1, wherein the vulcanisation accelerator(s) are dithiocarbamates active at temperatures below 100° C.

10. Composition according to claim 1, wherein the viscosity-reducing agent is water and in that the composition is present in the form of an aqueous emulsion formed from a dispersion of an organic phase consisting of a homogeneous mixture of bitumen, the elastomeric polymer vulcanisable with sulphur, the sulphur-donating vulcanising agent and the vulcanisation accelerator in an aqueous phase comprising an emulsifying system.

11. Composition according to claim 10, wherein the amount of organic phase present in the emulsion is 30 to 90% of the weight of said emulsion.

12. Composition according to claim 10, which is prepared by preparing a homogeneous mixture comprising the bitumen, the elastomeric polymer vulcanisable with sulphur, the vulcanising agent and the vulcanisation accelerator, then converting said mixture into an aqueous emulsion, the aqueous emulsion produced having a temperature below 100° C. and subsequently being maintained at such a temperature.

13. A composition according to claim 12, wherein the homogeneous mixture is produced by first bringing the elastomeric polymer into contact with the bitumen in the molten state at a temperature between 100° C. and 230° C., stirring the mixture for a period sufficient to form a homogeneous product, and then incorporating the vulcanizing agent and subsequently the vulcanization accelerator into said homogeneous product, while the mixture is stirred all the time and kept in a molten state.

14. Composition according to claim 13, wherein before incorporating the vulcanising agent and the vulcanisation accelerator into the homogeneous product, said product is subjected to prevulcanisation by means of a sulphur-donating vulcanising system, the prevulcanisation being carried out in such a manner that a homogeneous prevulcanised product having a viscosity of at most 2 Pa.s in the molten state is obtained.

15. A composition according to claim 12, wherein the emulsion is formed by mixing the homogeneous mixture in the form of a molten mass whose temperature is between 100° C. and 180° C. with the aqueous phase having a temperature between 15° C. and 80° C. and comprising the emulsifying system simultaneously and separately into an emulsion-forming zone and maintaining the entire mixture in said zone for a period sufficient for forming the emulsion.

16. Composition according to claim 1, wherein the viscosity-reducing agent is hydrocarbon oil and in that the composition is in the form of a homogeneous hydrocarbon composition which comprises the bitumen, the elastomeric polymer vulcanisable with sulphur, the vulcanising agent, the vulcanisation accelerator and the hydrocarbon oil.

17. Composition according to claim 16, wherein the hydrocarbon oil it contains represents 2% to 70% of the weight of the bitumen.

18. Composition according to claim 16, wherein the hydrocarbon oil is a petroleum distillate which has a distillation range at atmospheric pressure, determined in accordance with ASTM Standard D 86-87, between 100° C. and 500° C.

19. Composition according to claim 18, characterised in that the petroleum distillate is of the groups consisting of a petroleum cut of aromatic character, a petroleum cut of naphthenoaromatic character, a petroleum cut of naphthenoparaffinic character and a petroleum cut of paraffinic character.

20. The composition according to claim 16, wherein the homogeneous hydrocarbon composition is formed by first bringing the elastomeric polymer into contact with the bitumen in the molten state, at a temperature between 100° C. and 230° C. stirring the mixture for a period sufficient to form a homogeneous product, then incorporating the vulcanizing agent and subsequently the vulcanization accelerator and the hydrocarbon oil into said homogeneous product, while the mixture is all the time stirred and maintained in the molten state, incorporation of the hydrocarbon oil being carried out before incorporation of the vulcanizing agent or after incorporation of the vulcanization accelerator, the homogeneous hydrocarbon composition produced having a temperature below 100° C. and being subsequently maintained at such a temperature.

21. The composition according to claim 1, wherein the viscosity-reducing agent is present in an amount to render the composition fluid at a temperature between ambient temperature and 100° C.

22. The composition according to claim 3, wherein said bitumen penetration ranges from 10 to 300.

23. The composition according to claim 6, wherein the copolymer of styrene and a conjugated diene has a viscosity-average molecular weight between 30 000 and 500,000.

24. The composition according to claim 1, wherein the proportion of vulcanization accelerator is from 0.1% to 10% of the weight of the elastomeric polymer.

25. The composition according to claim 10, wherein the aqueous phase further comprises an agent for controlling the pH of the emulsion.

26. The composition according to claim 24, wherein the amount of organic phase present in the emulsion is 30% to 90% of the weight of the emulsion.

27. The composition according to claim 11, wherein the amount of the organic phase is from 50% to 85% of the weight of the emulsion.

28. The composition according to claim 12, wherein the aqueous emulsion is produced at a temperature between ambient temperature and 100° C.

29. The composition according to claim 13, wherein the bitumen in the molten state is at a temperature between 120° C. and 180° C.

30. The composition according to claim 15, wherein the molten mass is at a temperature between 120° C. and 160° C.

31. The composition according to claim 15, wherein the aqueous phase contains an agent for controlling the pH of the emulsion.

32. The composition of claim 1 wherein said elastomeric polymer is a copolymer of styrene and a conjugated diene; said sulphur-donating vulcanization agent is selected from the group consisting of sulphur and polysulphides; said vulcanization accelerator is at least one organic dithiocarbamate and said viscosity-reducing agent is water in an amount representing 15 to 50% of the weight of said composition.

33. The composition of claim 1 wherein said elastomeric polymer is a copolymer of styrene and a conjugated diene; said sulphur-donating vulcanization agent is selected from the group consisting of sulphur and polysulphides; said vulcanization accelerator is at least one organic dithiocarbamate and said viscosity-reducing agent is selected from the group consisting of hydrocarbon oils with a distillation range at atmosphere pressure, determined in accordance with ASTM Standard D86-87 is between 100° C. and 500° C. and said viscosity-reducing agent is 4% to 40% of the weight of the composition.

* * * * *

UNITED STATES PATENT AND TRADEMARK OFFICE
CERTIFICATE OF CORRECTION

PATENT NO. : 5,750,598
DATED : May 12, 1998
INVENTOR(S) : Dennis Krivohlavek, et al It is certified that error appears in the above-indentified patent and that said Letters Patent is hereby corrected as shown below:  Drawing Sheets 1-3, consisting of Figures 1-3 should be inserted as per attached.

In the title page of the Patent, following the Abstract, change

"33 Claims, No Drawings" to --33 Claims, 3 Drawing sheets--.

Signed and Sealed this

Tenth Day of November 1998

*Attest:*

BRUCE LEHMAN

*Attesting Officer*    Commissioner of Patents and Trademarks